(12) United States Patent
Yang et al.

(10) Patent No.: US 10,224,593 B2
(45) Date of Patent: Mar. 5, 2019

(54) SUPPORT ASSEMBLY AND SATELLITE ANTENNA MODULE USING THE SAME

(71) Applicant: Wistron NeWeb Corp., Hsinchu (TW)

(72) Inventors: Lan-Chun Yang, Hsinchu (TW); San-Yi Kuo, Hsinchu (TW); Shun-Chung Kuo, Hsinchu (TW); Chun-Wei Wang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 274 days.

(21) Appl. No.: 15/217,146

(22) Filed: Jul. 22, 2016

(65) Prior Publication Data
US 2017/0125876 A1    May 4, 2017

(30) Foreign Application Priority Data
Nov. 3, 2015 (TW) ............... 104136134 A

(51) Int. Cl.
| | | |
|---|---|---|
| *H01Q 1/12* | (2006.01) | |
| *H01Q 19/13* | (2006.01) | |
| *F16M 13/02* | (2006.01) | |
| *H01Q 15/16* | (2006.01) | |
| *H01Q 3/06* | (2006.01) | |
| *F16H 25/20* | (2006.01) | |
| *F16B 2/10* | (2006.01) | |

(52) U.S. Cl.
CPC .......... *H01Q 1/1221* (2013.01); *F16M 13/02* (2013.01); *H01Q 1/125* (2013.01); *H01Q 1/1207* (2013.01); *H01Q 3/06* (2013.01); *H01Q 15/16* (2013.01); *H01Q 19/13* (2013.01); *F16B 2/10* (2013.01); *F16H 25/20* (2013.01)

(58) Field of Classification Search
CPC ...... H01Q 1/1221; H01Q 15/16; H01Q 19/13; F16M 13/02; F16H 25/20; F16B 2/10
USPC ....................... 343/880, 890; 248/544, 124.1
See application file for complete search history.

(56) References Cited

U.S. PATENT DOCUMENTS

| 7,411,562 B2 | 8/2008 | Lin |
| 2010/0249513 A1 | 9/2010 | Tydlaska |

(Continued)

FOREIGN PATENT DOCUMENTS

| TW | M435807 U | 8/2012 |
| TW | M452471 U | 5/2013 |

(Continued)

*Primary Examiner* — Hai Tran
(74) *Attorney, Agent, or Firm* — McClure, Qualey & Rodack, LLP

(57) ABSTRACT

A support assembly is provided and includes an adapter, a stand, and a dish backing structure. The adapter includes two side plates and an upper plate. The side plates are respectively located at the two sides of the adapter. The upper plate is connected to the side plates and has a lower location hole. The stand is connected to the adapter. The dish backing structure has a receiving portion and includes a top wall and two side walls respectively located at the both sides of the receiving portion. The top wall has an upper location hole. When the receiving portion is connected to the adapter, a portion of the top wall abuts against the upper plate, and a gap is formed between the top wall and the upper plate. In addition, the upper location hole is aligned with the lower location hole.

12 Claims, 11 Drawing Sheets

(56) References Cited

U.S. PATENT DOCUMENTS

| | | | |
|---|---|---|---|
| 2014/0084121 A1* | 3/2014 | Lee | H01Q 1/1207 248/230.1 |
| 2014/0084127 A1 | 3/2014 | Lee et al. | |
| 2014/0306072 A1* | 10/2014 | Yang | H01Q 3/08 248/124.1 |

FOREIGN PATENT DOCUMENTS

| | | |
|---|---|---|
| TW | M455659 U | 6/2013 |
| TW | M455992 U | 6/2013 |
| TW | M468034 U | 12/2013 |

\* cited by examiner

SUPPORT ASSEMBLY AND SATELLITE ANTENNA MODULE USING THE SAME

CROSS REFERENCE TO RELATED APPLICATIONS

This Application claims priority of Taiwan Patent Application No. 104136134, filed on Nov. 3, 2015, the entirety of which is incorporated by reference herein.

BACKGROUND OF THE INVENTION

Field of the Invention

The present invention relates to a communication device and elements thereof, and more particularly to a satellite antenna module and a support assembly thereof.

Description of the Related Art

With the development of satellite techniques and applications, more and more information is transmitted via satellite, such as broadcast television, weather maps, communication, and so on. Being able to adjust a satellite antenna to receive satellite signals is critical during the installation of the satellite antenna. When the satellite antenna is adjusted to an appropriate position, signals transmitted from the satellite antenna may have optimal strengths, and can be transmitted in severe weather conditions as well.

Generally, the transceiver of a traditional conventional dish satellite antenna includes a dish reflector for focusing satellite signals to be received, and at least one low noise signal amplifier (LNBF) for receiving the focused signals. In addition, in order to accurately receive the satellite signals, the longitude and latitude of the antenna dish and the angle between the antenna dish and the satellite should be carefully checked and precisely positioned.

In prior arts, an antenna dish of a satellite antenna is installed on a support assembly. However, the support assembly can be easily deformed and knocked over by an external force. Therefore, if the antenna dish is installed outdoor and suffers strong winds, the support assembly may lose its correct receiving orientation, or may be damaged due to a collapse. In addition, it is time-consuming and is not easy to precisely install the support assembly; as a consequence, antenna dish assembled on that support assembly may not be able to accurately receive satellite signals.

Therefore, it is desirable to provide a new support assembly to mitigate and/or obviate the aforementioned problems.

BRIEF SUMMARY OF THE INVENTION

Accordingly, one aspect of the present invention is to provide a support assembly that is easy to assemble. The other aspect of the present invention is to provide a more compact support assembly with higher reliability so as to be used in different weather conditions.

In accordance with one embodiment of the disclosure, the support assembly includes an adapter, a stand, and a dish backing structure. The adapter includes two side plates and an upper plate. The side plates are respectively located at the two sides of the adapter. The upper plate is connected to the side plates and has a lower location hole. The stand is connected to the adapter. The dish backing structure has a receiving portion which is capable of receiving the adapter and includes two side walls and a top wall. The side walls are respectively located at the both sides of the receiving portion. The top wall is connected to the side walls and has an upper location hole, a first section and a second section. When the receiving portion is connected to the adapter, the second section abuts against the top wall, the first section and the upper plate of the adapter define a gap, and the upper location hole is aligned with the lower location hole.

Another aspect of the present disclosure is to provide a satellite antenna module using any one of the support assembly in the above-mentioned embodiments. The satellite antenna module includes an antenna dish disposed on the dish backing structure of the support assembly.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
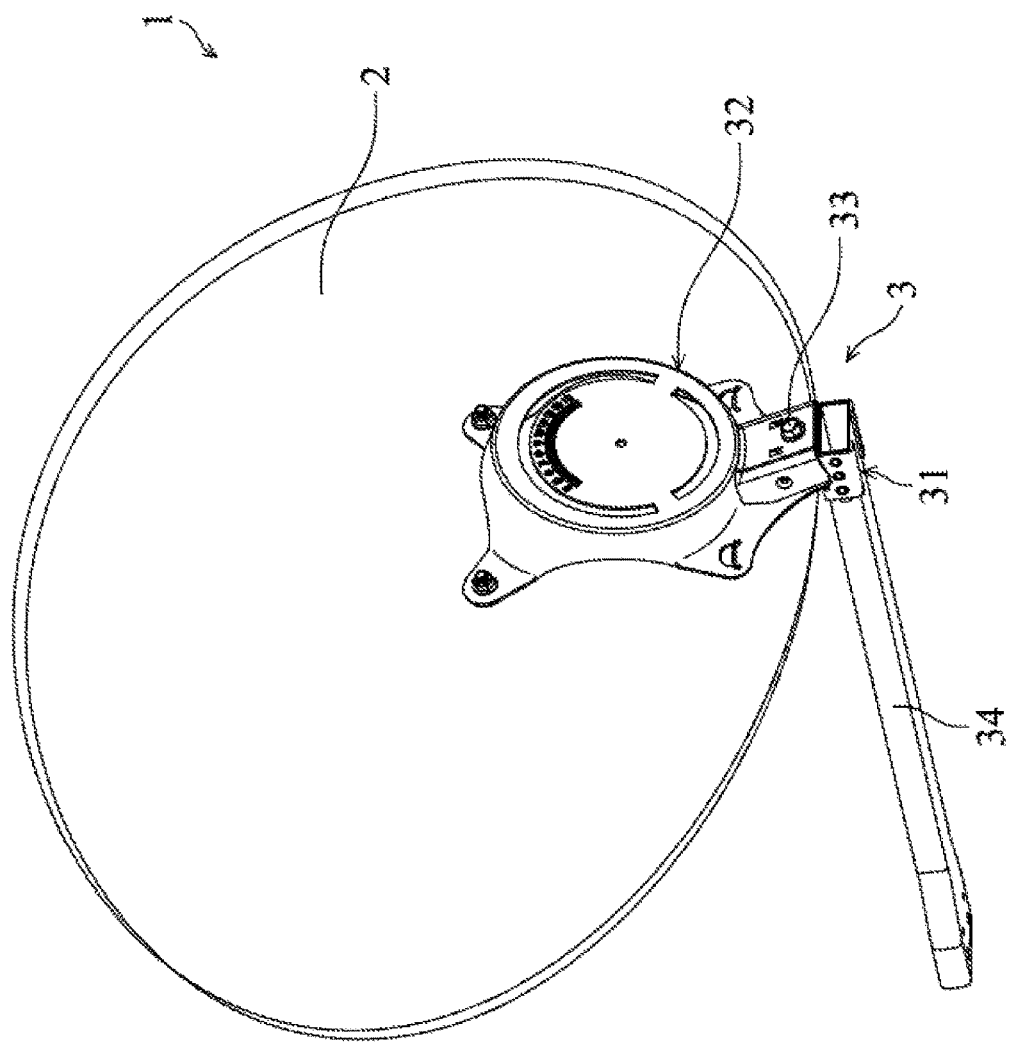
FIG. 1 shows a schematic view of a satellite antenna module, in accordance with one embodiment of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purposes of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

FIG. 1 shows a schematic view of a satellite antenna module 1, in accordance with one embodiment of the disclosure. The satellite antenna module 1 includes an antenna dish 2 for receiving and reflecting the satellite signals and a support assembly 3. The support assembly 3 is disposed on a fixed plane, such as an outer wall of a building or a ground, and the antenna dish 2 is held by the support assembly 3. In this manner, the antenna dish 2 is disposed on the fixed plane stably with the support assembly 3 even if being used in severe weather conditions. The structural features of the support assembly 3 in accordance with one embodiment of the disclosure are described below.

In one embodiment, as shown in FIG. 1, the support assembly 3 includes a dish backing structure 32, an adapter 31, a stand 34 connected to the adapter 31 for connecting the dish backing structure 32 and the adapter 31 to a wall, and a fastening member 33 for fixing the dish backing structure 32 and the adapter 31. The elements of the support assembly 3 can be added to or omitted, and the invention should not be limited by the embodiment.

Figure 2:
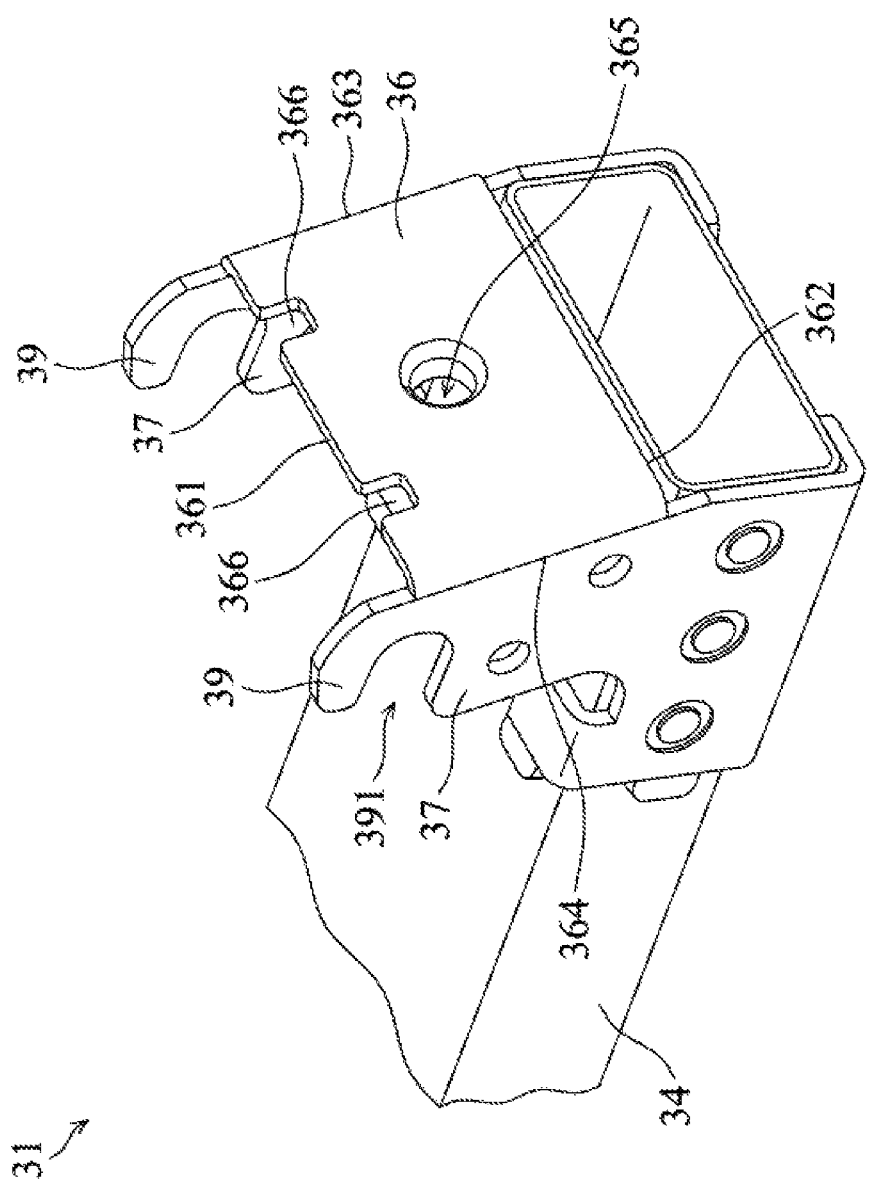
FIG. 2 shows a schematic view of an adapter, in accordance with one embodiment of the disclosure.

FIG. 2 shows a schematic view of the adapter 31, in accordance with one embodiment of the disclosure. The adapter 31 includes an upper plate 36, two side plates 37, and two C-shaped hook structures 39. The elements of the adapter 31, can be added to or omitted, and the invention should not be limited by the embodiment.

In one embodiment, the upper plate 36 is a rectangular plate and has a front edge 361, a rear edge 362, and two lateral edges 363 and 364. The rear edge 362 is adjacent to the stand 34, and the front edge 361 is opposite to the rear edge 362. The two lateral edges 363 and 364 are connected between the front edge 361 and the rear edge 362. A lower location hole 365 penetrates the upper plate 36. In one embodiment, the lower location hole 365 can be spaced from the lateral edge 363 and the lateral edge 364 by the same distance. Nonetheless, the disclosure should not be limited thereto. Alternatively, the lower location hole 365 can be spaced from the lateral edge 363 and the lateral edge 364 by different distances as well.

The two side plates 37 are respectively connected to two opposite lateral edges 363 and 364, and are connected to the stand 34. The two hook structures 39 are adjacent to the front edge 361 of the upper plate 36 and respectively connected to the two lateral edges 363 and 364. The two hook structures 39 are extended and bent in a direction away from the side plates 37 and away from the upper plate 36, where the two hook structures 39 respectively define two rotation openings 391. In some embodiments, there may be only one hook structure 39 extended from one of the two side plates 37. The two side plates 37 may be fixed on one end of the stand 34 by any suitable method (such as screwing or riveting). Alternatively, the stand 34, the upper plate 36, the two side plates 37, and the two hook structures 39 can be formed integrally as well.

As shown in FIG. 2, two notches 366 are formed at the front edge 361 of the upper plate 36. The number of the notches 366 may be altered according to different needs. For example, the number of the notch 366 formed at the front edge 361 of the upper plate 36 can be one, two or more, or even none.

Figure 3:
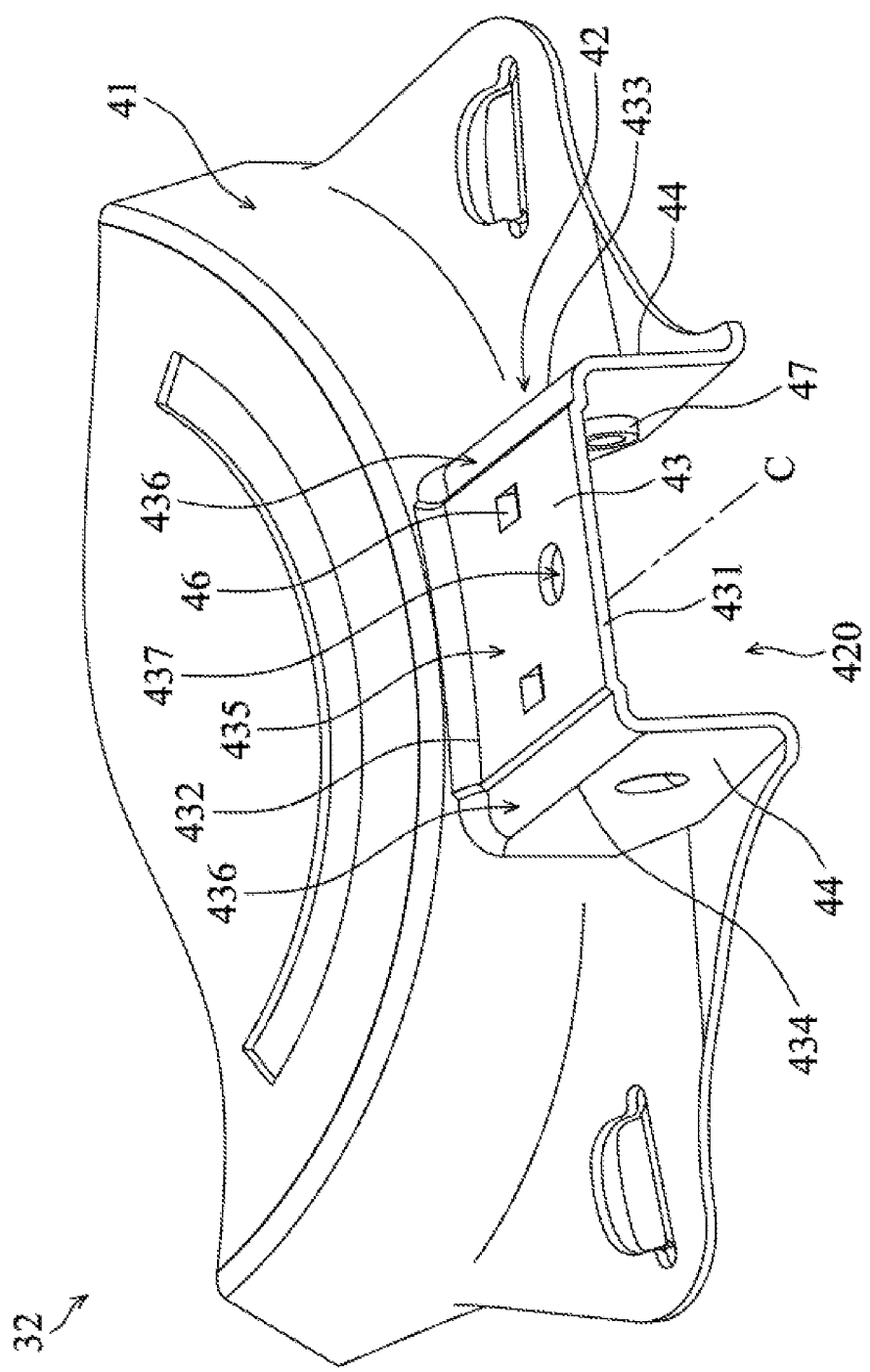
FIG. 3 shows a schematic view of a dish backing structure, in accordance with one embodiment of the disclosure.

FIG. 3 shows a schematic view of a dish backing structure 32, in accordance with one embodiment of the disclosure. The dish backing structure 32 is configured to support the antenna dish 2 (see FIG. 1). In one embodiment, the dish backing structure 32 has a dish-shaped structure 41, a receiving portion 42, and numerous positioning structures, including two first positioning structures 46 and two second positioning structures 47.

In the embodiment, the receiving portion 42 includes a top wall 43, and two side walls 44. The top wall 43 extends outwardly from one side of the dish-shaped structure 41.

The top wall 43 is a rectangular-shaped plate and has a front edge 431, a rear edge 432, and two lateral edges 433 and 434. The rear edge 432 is connected to the dish-shaped structure 41, and the front edge 431 is opposite to the rear edge 432. The two lateral edges 433 and 434 are connected between the front edge 431 and the rear edge 432. An upper location hole 437 penetrates the top wall 43. The two side walls 44 extend outwardly from one side of the dish-shaped structure 41 and are respectively connected to the two lateral edges 433 and 434. Each of the two side walls 44 has an inner surface 441 (FIG. 4) facing one another. As shown in FIG. 3, a channel 420 extending along an axis C is defined by the top wall 43 and the two side walls 44. The top wall 43 may be made of materials such as steel or aluminum alloy. The side walls 44 may be made of the same material as the top wall 43.

In the embodiment, the top wall 43 is divided into a first section 435 and two second section 436. The front boundary and the rear boundary of the first section 435 are respectively located on the front edge 431 and the rear edge 432, and the right boundary and the left boundary of the first section 435 is spaced from the two lateral edges 433 and 434 by a distance. The two second sections 436 are respectively located between two sides of the first section 435 and the lateral edges 433 and 434, in which the front boundary and the rear boundary of each of the two second sections 436 are respectively located on the front edge 431 and the rear edge 432.

In one embodiment, the upper location hole 437 penetrates the first section 435 of the top wall 43. The upper location hole 437 can be spaced from the lateral edge 433 and the lateral edge 434 by the same distance. Nonetheless, the disclosure should not be limited thereto; the upper location hole 437 may also be spaced from the lateral edge 433 and the lateral edge 434 by different distances.

Figure 4:
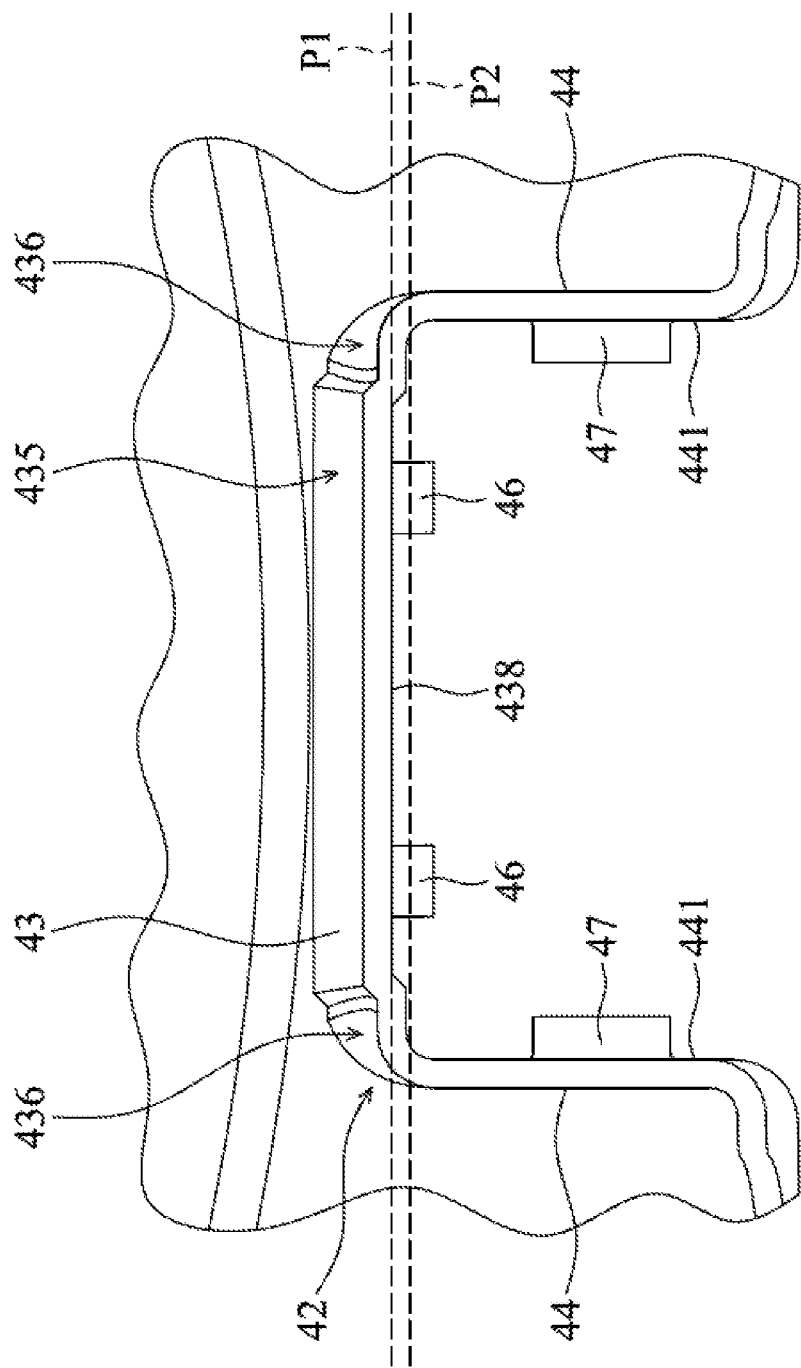
FIG. 4 shows a side view of a receiving portion, in accordance with one embodiment of the disclosure.

FIG. 4 shows a side view of a receiving portion, in accordance with one embodiment of the disclosure. In the embodiment, the lower surface of the first section 435 of the top wall 43 extends along a first plane P1, whereas the lower surfaces of the two second sections 436 extend along a second plane P2 parallel to the first plane P1. The distance between the first plane P1 and the second plane P2 is greater than 0 mm and smaller than or equal to the thickness of the top wall 43.

Two first positioning structures 46 are configured to limit the movement of the adapter 31 in a direction parallel to the top wall 43. In the embodiment, the two first positioning structures 46 are formed on an inner surface 438 of the top wall 43 and corresponding to the first section 435. The two first positioning structures are positioning blocks. The shape and the size of each positioning block correspond to that of the corresponding notch 366. The number of the first positioning structures 46 may be altered. For example, the number of the first positioning structures 46 formed at the inner surface 438 of the top wall 43 can be one, two or more, or even none.

Two second positioning structures 47 are configured to limit the movement of the adapter 31 in a direction parallel to the side walls 44. In the embodiment, the two second positioning structures 47 are formed on the inner surfaces 441 of the side walls 44. The two second positioning structures 47 are pivoting shafts. The shape and the size of each of the second positioning structures 47 correspond to that of the rotation opening 391, so that the rotation opening 391 can be detachably and pivotably connected to the pivoting shafts 47. In some embodiments, there may be only one second positioning structure 47 formed on the inner surface 441 of one of the side wall 44. For the purposes of illustration, in the following descriptions, "first positioning structure" is referred to "positioning block", and "second positioning structure" is referred to "pivoting shaft".

FIGS. 5A-5D show steps for assembling the support assembly 3, in accordance with one embodiment of the disclosure.

Figure 5A:
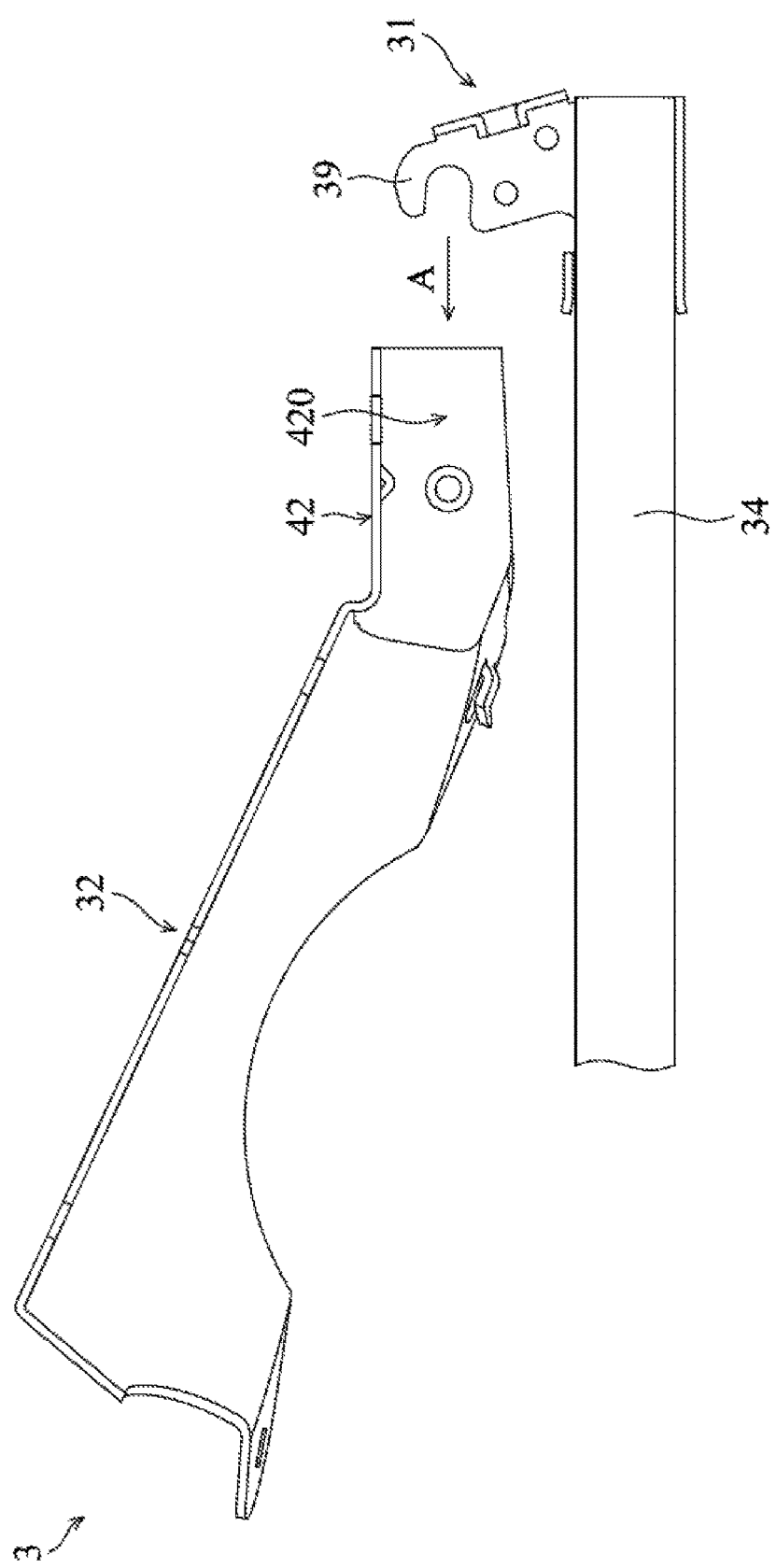
FIGS. 5A-5D show steps of assembling a support assembly, in accordance with one embodiment of the disclosure.

First, as shown in FIG. 5A, insert the adapter 31 into the channel 420 of the dish backing structure 32 along a direction A as indicated in FIG. 5A. Afterwards, as shown in FIG. 5B, hook the rotation openings 391 of the hook structures 39 onto the pivoting shafts 47.

Figure 5B:
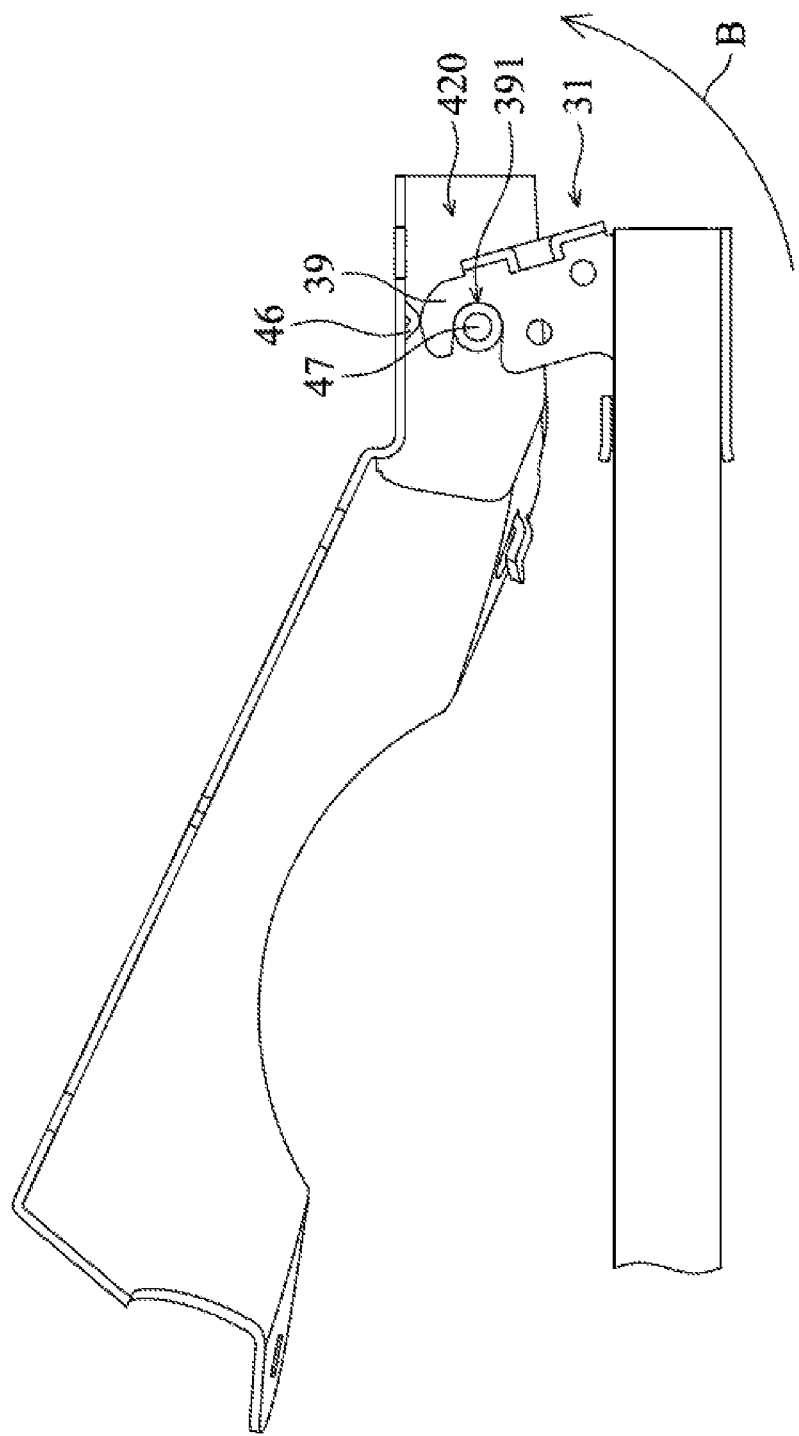
Figure 5C:
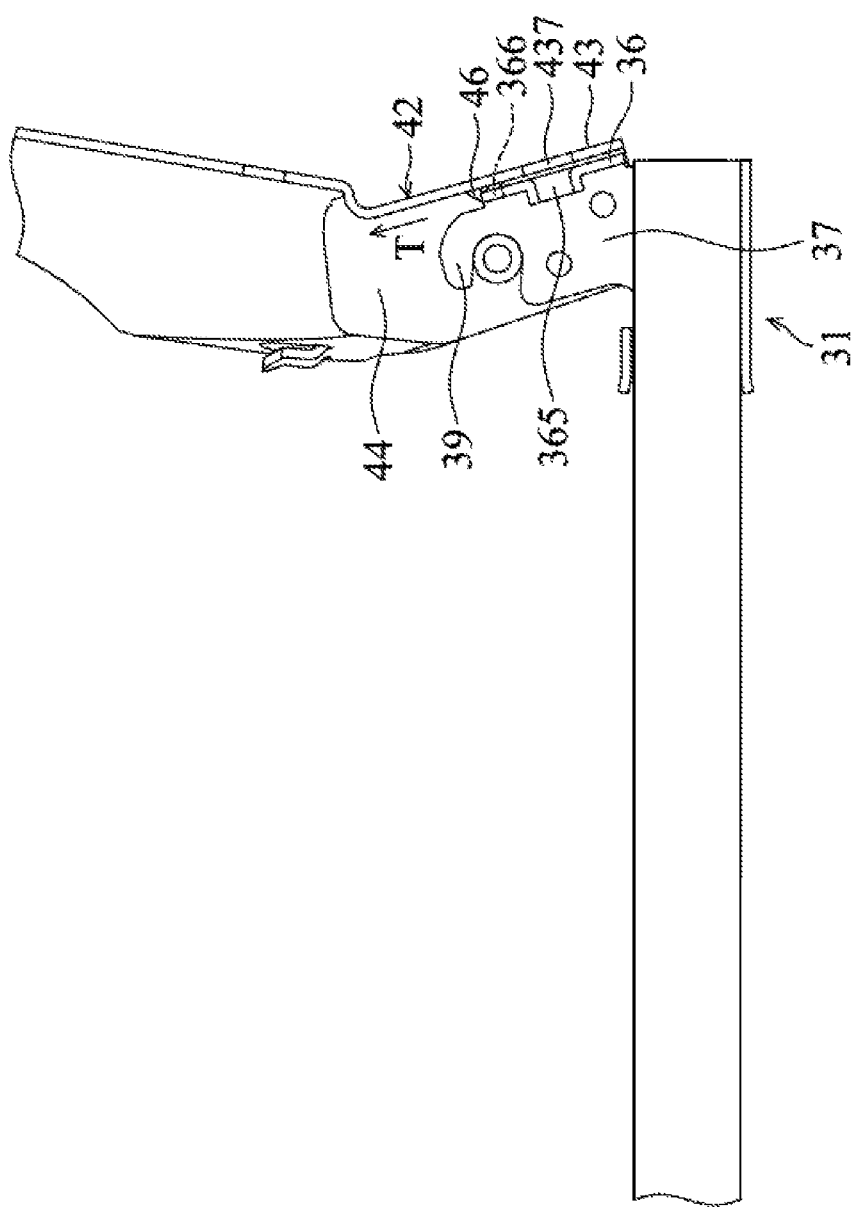
Figure 5D:
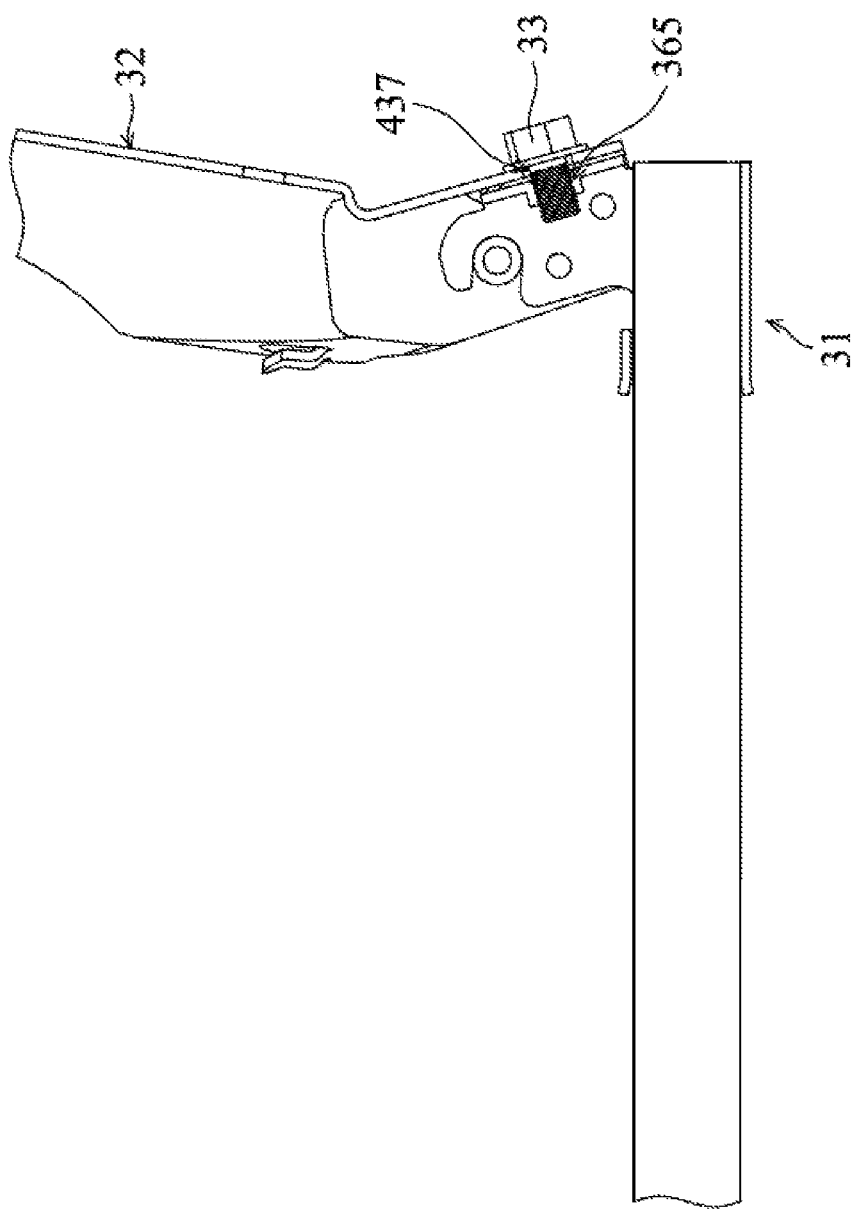

Afterwards, rotate the adapter 31 in a direction B as indicated in FIG. 5B, so that the hook structures 39 are rotated about the pivoting shaft 47. The rotation is not stopped until the positioning blocks 46 engage the notches 366 formed on the adapter 31 and the movement of the adapter 31 in direction T toward the dish backing structure 32 is limited as the positioning blocks 46 are abutted against the notches 366, as shown in FIG. 5C. At this time, the upper plate 36 of the adapter 31 is positioned to be adjacent to the top wall 43 of the receiving portion 42, and the two side plates 37 are positioned to be adjacent to the two side walls 44 (only one side plane 37 and one side wall 44 are shown in FIG. 5C). In addition, the lower location hole 365 on the upper plate 36 is aligned to the upper location hole 437. Afterwards, as shown in FIG. 5D, a fastening member 33 (such as a screw) is inserted through the upper location hole 437 and the lower location hole 365 so as to connect the adapter 31 to the dish backing structure 32.

Figure 6:
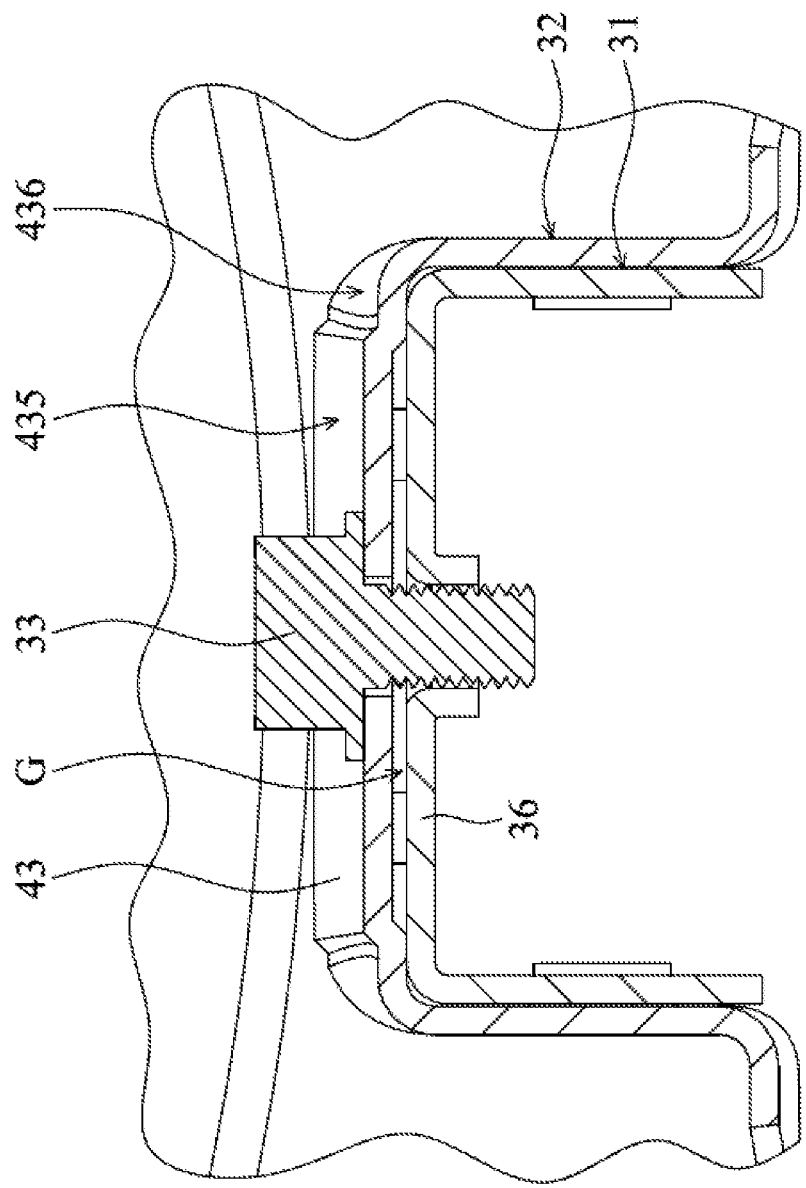
FIG. 6 shows a cross-sectional schematic view of partial elements of the satellite antenna module as an adapter being connected to the dish backing structure, in accordance with one embodiment of the disclosure.

At this time, as shown in FIG. 6, since there is a difference in height between the first section 435 and the second sections 436, the top wall 43 of the receiving portion 42 is not entirely in contact with the adapter 31. Specifically, as shown in FIG. 6, after the adapter 31 is connected to the dish backing structure 32 by the fastening member 33, while the second sections 436 of the top wall 43 are directly in contact with the top plate 36, the first section 435 of the top wall 43 is not in contact with the top plate 36, and a gap G is defined therebetween. With the gap G, the adapter 31 and the dish backing structure 32 serve as a spring disc to avoid disengagement of the fastening member 33, as the dish backing structure 32 vibrates relative to the adapter 31 or as the dish backing structure 32 is drawn violently by a heavy external force caused by strong winds or the like. As a result, the antenna dish 2 is prevented from being offset from the preset position.

Is should be noted that the problem cannot be solved by adding one spring disc between the adapter and a conventional receiving portion in which there is no height difference formed on the top wall, because the stress is concentrated on the spring disc after the fastening member has been secured, and a warp will occur at the edges of the top wall and the upper plate. This inevitably causes the deformation of the top wall or the upper plate and the disengagement of the fastening member. On the contrary, by forming the gap G between the top wall and the upper plate, the stress caused by the fastening member is dispersed over the edges of the top wall and the upper plate, and thus the edges of the top wall and the upper plate can become more rigid, as a result, no warp will occur.

It should be appreciated that the structural features of the top wall 43 of the dish backing structure 32 should not be limited to the above-mentioned embodiments. The positions of the first section 435 and the second sections 436 formed on the top wall 43 may be changed. In the description below, some exemplary possible implementation structures of the top walls 43 will be illustrated.

Figure 7:
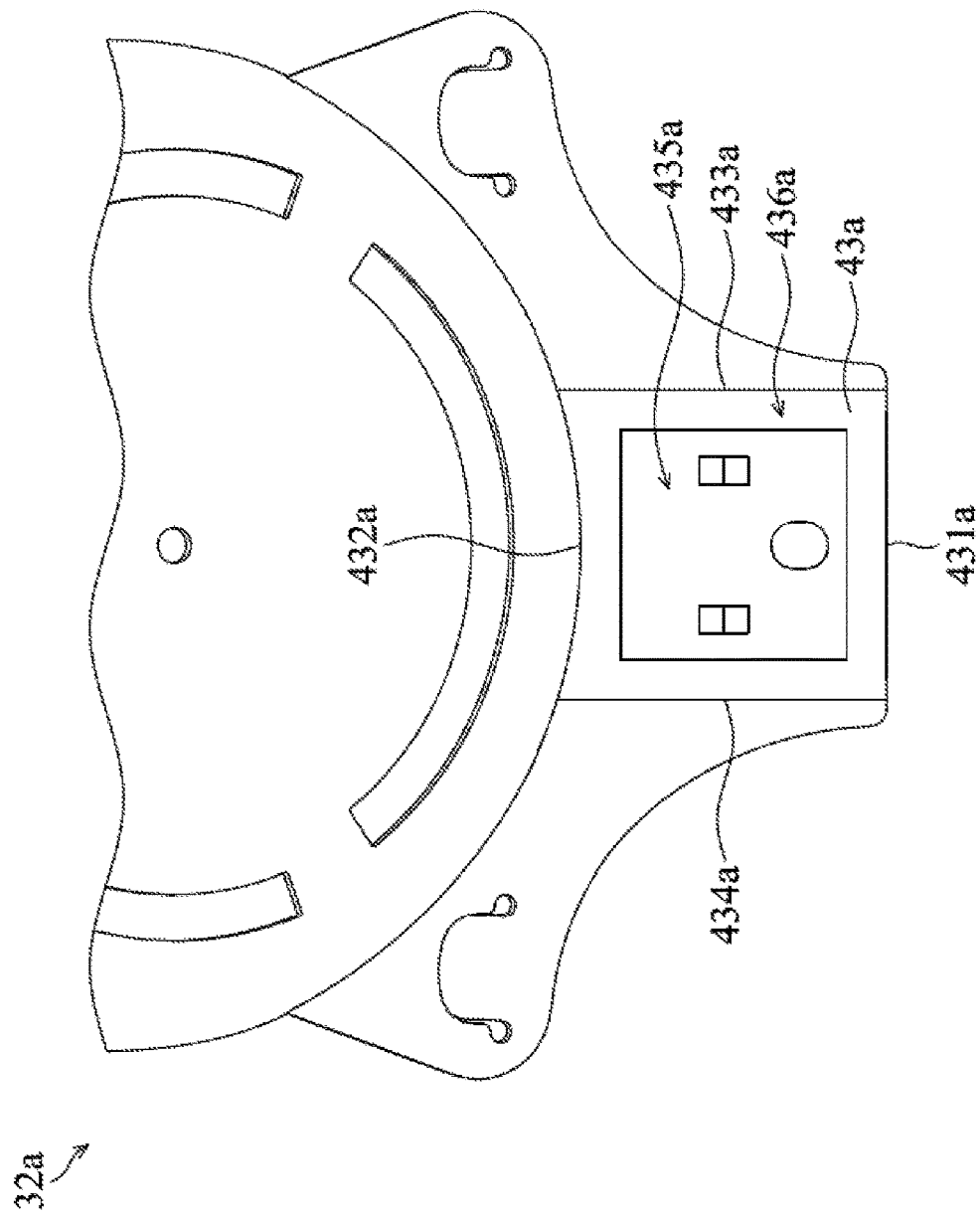
FIG. 7 shows a schematic view of a dish backing structure, in accordance with one embodiment of the disclosure.

As shown in FIG. 7, the top wall 43a of the dish backing structure 32a includes a first section 435a and a second section 436a. The first section 435a is located at the substantial center of the top wall 43a, and the second section 436a surrounds the first section 435a. The second section 436a is adjacent to the front edge 431a, the rear edge 432a, and the two lateral edges 433a and 434a.

Figure 8:
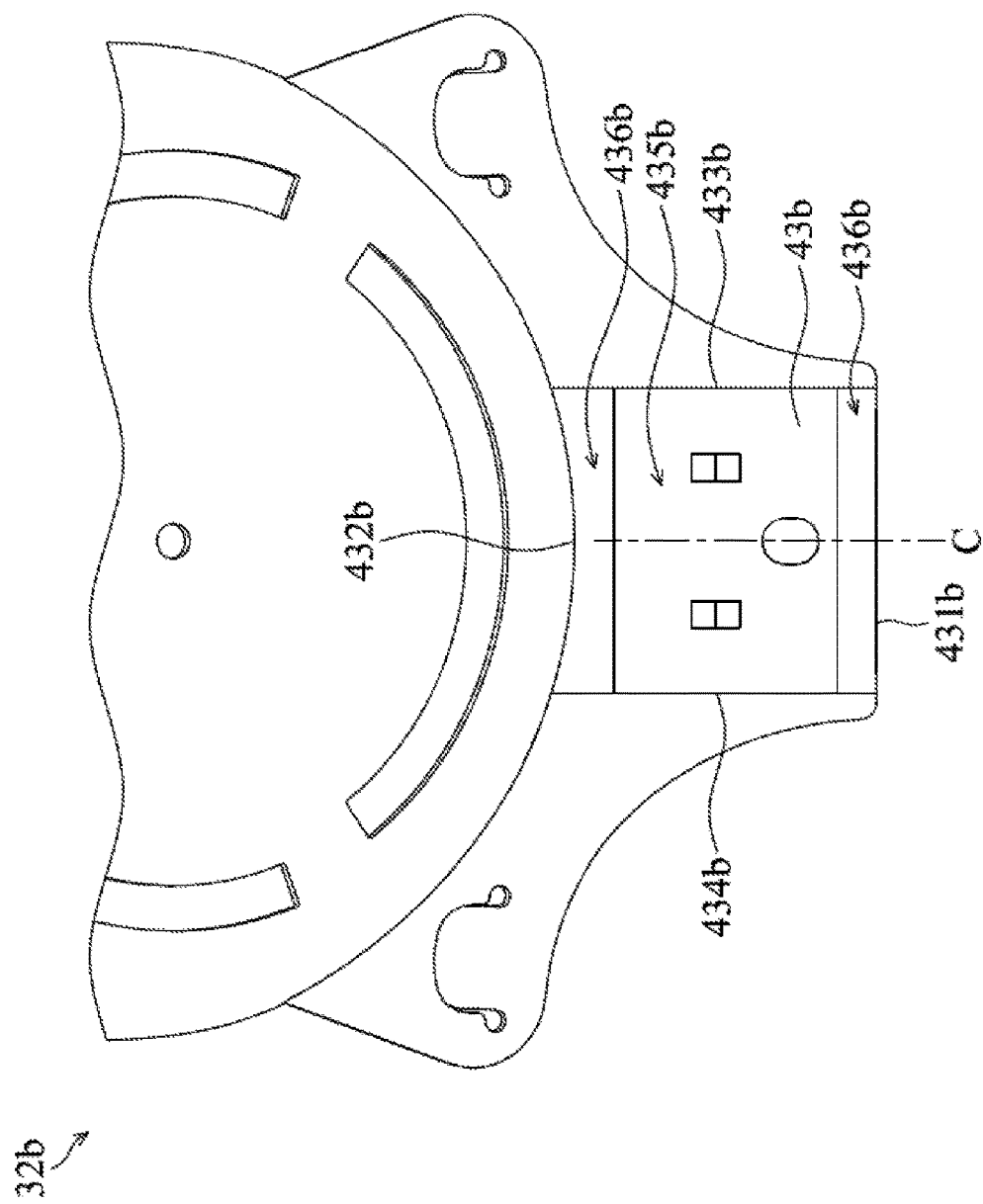
FIG. 8 shows a schematic view of a dish backing structure, in accordance with one embodiment of the disclosure.

As shown in FIG. 8, the top wall 43b of the dish backing structure 32b includes a first section 435b and two second sections 436b. The right boundary and the left boundary of the first section 435b are located at the two lateral edges 433b and 434b, and the front boundary and the rear boundary of the first section 435b are spaced from the front edge 431b and the rear edge 432b by a distance. The right boundary and the left boundary of each of the second sections 436b are located at the two lateral edges 433b and 434b, and the two planes 436b are arranged between the first section 435b and the front edge 431b and the rear edge 432b.

Embodiments of the support assembly in the disclosure include a dish backing structure having a top wall with height difference, and thus after the assembly of the support assembly, the top wall is not entirely in contact with an upper plate of an adapter. As a result, a buffer displacement is created between the dish backing structure and the adapter to protect the support assembly from being damaged by external force. In addition, with the arrangement of the positioning structures, the support assembly is assembled efficiently, and misalignment of the dish backing structure caused by inaccurate assembly is also avoided.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A support assembly, comprising
an adapter comprising:
two side plates respectively located at two sides of the adapter; and
an upper plate connected to the two side plates, wherein the upper plate has a lower location hole positioned along a centerline of the upper plate;
a stand connected to the adapter; and
a dish backing structure having a receiving portion capable of receiving the adapter and comprising:
two side walls respectively located at two sides of the receiving portion; and
a top wall connected to the two side walls and having a first section and two second sections, wherein each of the second sections is interconnected between the first section and one of the side walls, wherein the first section and the second sections are located at different planes, and an upper location hole is formed on the first section;
wherein when the receiving portion is connected to the adapter, the second sections abut against the upper plate, the first section and the upper plate of the adapter define a gap, and the upper location hole is aligned with the lower location hole for allowing a fastening member passing through the upper location hole and the lower location hole.

2. The support assembly as claimed in claim 1, wherein the adapter further comprises a hook structure extending from at least one of the two side plates and is arranged to be adjacent to the upper plate;

wherein the hook structure of the adapter defines a rotation opening, and the receiving portion further comprises one pivoting shaft positioned on an inner surface of at least one of the two side walls, wherein the rotation opening of the hook structure is detachably and pivotably connected to the pivoting shaft.

3. The support assembly as claimed in claim 1, wherein the top wall of the receiving portion has a positioning block, and a front edge of the upper plate of the adapter has a notch, wherein the movement of the adapter in a direction toward the dish backing structure is limited as the positioning block abuts against the notch of the adapter.

4. The support assembly as claimed in claim 1, wherein the dish backing structure defines a channel along an axis, and the second section extends in a direction that is parallel to the axis.

5. The support assembly as claimed in claim 1, wherein the dish backing structure defines a channel along an axis, and the second section extends in a direction that is perpendicular to the axis.

6. The support assembly as claimed in claim 1, wherein the material of the top wall is steel or aluminum alloy.

7. The support assembly as claimed in claim 1, wherein a height difference between the first section and the second section is greater than 0 mm and smaller than or equal to the thickness of the top wall.

8. The support assembly as claimed in claim 1, wherein the second section surrounds the first section.

9. The support assembly as claimed in claim 1, wherein the stand is connected to the two side plates of the adapter by riveting.

10. The support assembly as claimed in claim 1, the plane at which the first section is located is parallel to the plane at which the second sections are located.

11. A satellite antenna module, comprising:
a support assembly, comprising:
an adapter comprising:
two side plates respectively located at two sides of the adapter; and
an upper plate connected to the two side plates, wherein the upper plate has a lower location hole positioned along a centerline of the upper plate;
a stand connected to the adapter; and
a dish backing structure having a receiving portion capable of receiving the adapter and comprising:
two side walls respectively located at two sides of the receiving portion; and
a top wall connected to the two side walls and having a first section and two second sections, wherein each of the second sections is interconnected between the first section and one of the side walls, wherein the first section and the second sections are located at different planes, and an upper location hole is formed on the first section;
wherein when the receiving portion is connected to the adapter, the second sections abut against the upper plate, the first section and the upper plate of the adapter define a gap, and the upper location hole is aligned with the lower location hole for allowing a fastening member passing through the upper location hole and the lower location hole; and
an antenna dish disposed on the dish backing structure of the support assembly.

12. The satellite antenna module as claimed in claim 11, the plane at which the first section is located is parallel to the plane at which the second sections are located.

* * * * *